United States Patent
Chen et al.

(10) Patent No.: US 10,100,972 B2
(45) Date of Patent: Oct. 16, 2018

(54) FURNITURE PART ASSEMBLY

(71) Applicants: KING SLIDE WORKS CO., LTD., Kaohsiung (TW); KING SLIDE TECHNOLOGY CO., LTD., Kaohsiung (TW)

(72) Inventors: Ken-Ching Chen, Kaohsiung (TW); Hsiu-Chiang Liang, Kaohsiung (TW); Chun-Chiang Wang, Kaohsiung (TW)

(73) Assignees: King Slide Works Co., Ltd., Kaohsiung (TW); King Slide Technology Co., Ltd., Kaohsiung (TW)

(*) Notice: Subject to any disclaimer, the term of this patent is extended or adjusted under 35 U.S.C. 154(b) by 0 days.

(21) Appl. No.: 15/412,400

(22) Filed: Jan. 23, 2017

(65) Prior Publication Data
US 2018/0003339 A1  Jan. 4, 2018

(30) Foreign Application Priority Data

Jul. 1, 2016  (TW) .............................. 105121080 A

(51) Int. Cl.
| A47B 88/04 | (2006.01) |
| A47B 88/49 | (2017.01) |
| F16M 13/02 | (2006.01) |
| A47B 88/473 | (2017.01) |
| A47B 88/50 | (2017.01) |
| A47B 88/463 | (2017.01) |

(52) U.S. Cl.
CPC ........... *F16M 13/02* (2013.01); *A47B 88/473* (2017.01); *A47B 88/49* (2017.01); *A47B 88/50* (2017.01); *A47B 88/463* (2017.01); *F16M 2200/028* (2013.01)

(58) Field of Classification Search
CPC ..... A47B 88/473; A47B 88/49; A47B 88/483; A47B 88/12; A47B 88/47
See application file for complete search history.

(56) References Cited

U.S. PATENT DOCUMENTS

| 7,413,270 B2 * | 8/2008 | Chang ................. A47B 88/467 312/319.1 |
| 8,100,487 B2 | 1/2012 | Liang et al. |
| 8,172,345 B2 | 5/2012 | Liang et al. |
| 8,256,853 B2 * | 9/2012 | Chen ...................... F16C 29/02 312/319.1 |
| 8,308,251 B2 | 11/2012 | Liang et al. |
| 8,434,836 B2 * | 5/2013 | Holcomb ............. A47B 88/483 312/333 |

(Continued)

FOREIGN PATENT DOCUMENTS

| JP | 10025945 | * | 1/1998 |
| JP | 2006200213 | * | 8/2006 |
| JP | 2013002215 | * | 1/2013 |

*Primary Examiner* — Kimberley S Wright
(74) *Attorney, Agent, or Firm* — Rosenberg, Klein & Lee

(57) ABSTRACT

A furniture part assembly includes a first furniture part, a second furniture part, and a vibration detection device. The second furniture part is movable with respect to the first furniture part. The vibration detection device is arranged on one of the first furniture part and the second furniture part and includes a linking member. When a force is applied to the vibration detection device, the linking member is brought from a first state to a second state to prevent the second furniture part from moving with respect to the first furniture part in a certain direction.

15 Claims, 14 Drawing Sheets

(56) References Cited

U.S. PATENT DOCUMENTS

| | | | |
|---|---|---|---|
| 8,469,468 B2* | 6/2013 | Chen | A47B 88/463 |
| | | | 312/319.1 |
| 8,496,306 B2* | 7/2013 | Chen | A47B 88/463 |
| | | | 312/319.1 |
| 9,364,089 B1* | 6/2016 | Chen | A47B 88/047 |
| 9,375,083 B2* | 6/2016 | Haemmerle | A47B 88/04 |
| 9,681,748 B2* | 6/2017 | Chen | A47B 88/453 |
| 9,756,940 B2* | 9/2017 | Chen | A47B 88/467 |
| 2008/0061664 A1* | 3/2008 | Chang | A47B 88/467 |
| | | | 312/333 |
| 2008/0231153 A1* | 9/2008 | Cho | A47B 88/487 |
| | | | 312/333 |
| 2009/0058242 A1* | 3/2009 | Holcomb | A47B 88/12 |
| | | | 312/334.29 |
| 2012/0062088 A1* | 3/2012 | Chen | A47B 88/463 |
| | | | 312/319.1 |
| 2013/0004101 A1* | 1/2013 | Chen | A47B 88/463 |
| | | | 384/10 |
| 2013/0221822 A1* | 8/2013 | Holcomb | A47B 88/12 |
| | | | 312/334.44 |
| 2014/0072248 A1* | 3/2014 | Chen | A47B 88/47 |
| | | | 384/20 |

* cited by examiner

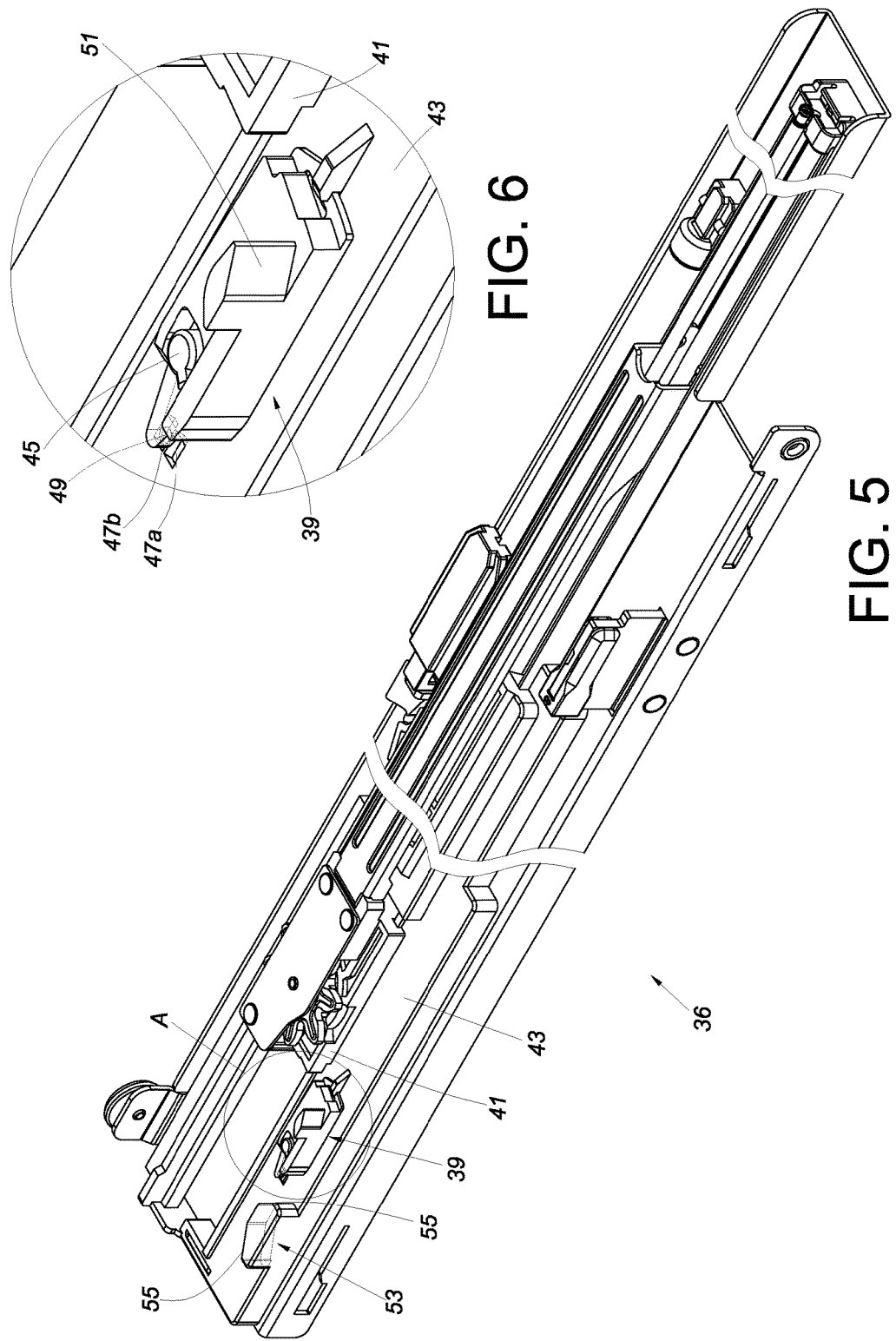

FURNITURE PART ASSEMBLY

FIELD OF THE INVENTION

The present invention relates to furniture parts and more particularly to a furniture part assembly in which a furniture part is kept from opening by accident when subjected to vibrations.

BACKGROUND OF THE INVENTION

Generally speaking, when a piece of furniture (e.g., a drawer, cabinet, or door) or equipment undergoes an earthquake of a certain magnitude, some moving part or parts of the furniture or equipment tend to move (e.g., open or close) on their own with respect to a stationary part. For the sake of safety, it is imperative to develop a product that can prevent two objects from moving freely with respect to each other due to an unintentional external force.

SUMMARY OF THE INVENTION

The present invention relates to a furniture part assembly in which a furniture part is kept from opening inadvertently when subjected to vibrations.

According to one aspect of the invention, a furniture part assembly includes a first furniture part, a second furniture part, and a vibration detection device. The second furniture part can be moved with respect to the first furniture part. The vibration detection device is arranged on one of the first furniture part and the second furniture part and includes a detecting member and a linking member. When a force is applied to the vibration detection device, the detecting member drives the linking member from a first state to a second state in response to the force, thereby preventing the second furniture part from moving with respect to the first furniture part in a certain direction.

Preferably, the furniture part assembly further includes an auxiliary member movably mounted on the second furniture part and a slide rail component connected to the second furniture part, and the vibration detection device is arranged on the first furniture part. When the linking member is in the second state and the auxiliary member is brought from a first predetermined state to a second predetermined state, the auxiliary member is blocked between the slide rail component and the linking member.

Preferably, the furniture part assembly further includes a base attached to the second furniture part, and the auxiliary member is pivotally connected to the base.

Preferably, the vibration detection device is arranged on the first furniture part, and the second furniture part includes a contact feature for bringing the linking member from the second state to the first state.

Preferably, the first furniture part includes a disengaging feature for bringing the auxiliary member from the second predetermined state to the first predetermined state.

Preferably, the second furniture part includes a positioning groove, and the auxiliary member has a positioning portion configured to be positioned in the positioning groove.

Preferably, the vibration detection device includes a first component and a second component movably mounted to the first component. The second component can be moved with respect to the first component in response to the force in order for the detecting member to drive the linking member in response to movement of the second component.

Preferably, the linking member is movably mounted on the first component and has a contact portion, and the detecting member is configured to drive the linking member via the contact portion, wherein the contact portion is an inclined or curved surface.

Preferably, the first component has a position-limiting feature, and the linking member has a position-limiting feature matching the position-limiting feature of the first component.

Preferably, the position-limiting feature of the first component is a protruding portion, and the position-limiting feature of the linking member is a furrow matching the protruding portion.

Preferably, the first component includes a space for receiving the second component, and the second component has a smaller size than the space.

Preferably, the vibration detection device includes a rolling member to facilitate movement of the second component with respect to the first component.

Preferably, the detecting member is a ball.

Preferably, the detecting member lies between the first component and the second component.

Preferably, the second component includes a supporting structure for supporting a portion of the detecting member.

Preferably, the supporting structure includes a bottom portion and an inner wall tilted with respect to the bottom portion, and the first component includes a wall portion adjacent to the supporting structure.

Preferably, the vibration detection device includes a cable element by which the second component is suspended from the first component. The cable element is flexible.

According to another aspect of the invention, a furniture part assembly includes a first furniture part, a second furniture part, and a vibration detection device. The second furniture part can be moved with respect to the first furniture part. The vibration detection device is arranged on one of the first furniture part and the second furniture part and includes a linking member. When a force is applied to the vibration detection device, the linking member is brought from a first state to a second state, thereby preventing the second furniture part from moving with respect to the first furniture part in a certain direction.

BRIEF DESCRIPTION OF THE DRAWINGS

FIG. 5 is a partial perspective view of a bottom portion of the second furniture part of the furniture part assembly in an embodiment of the present invention;

FIG. 6 is an enlarged view of the circled area A in FIG. 5;

DETAILED DESCRIPTION OF THE INVENTION

Figure 1:
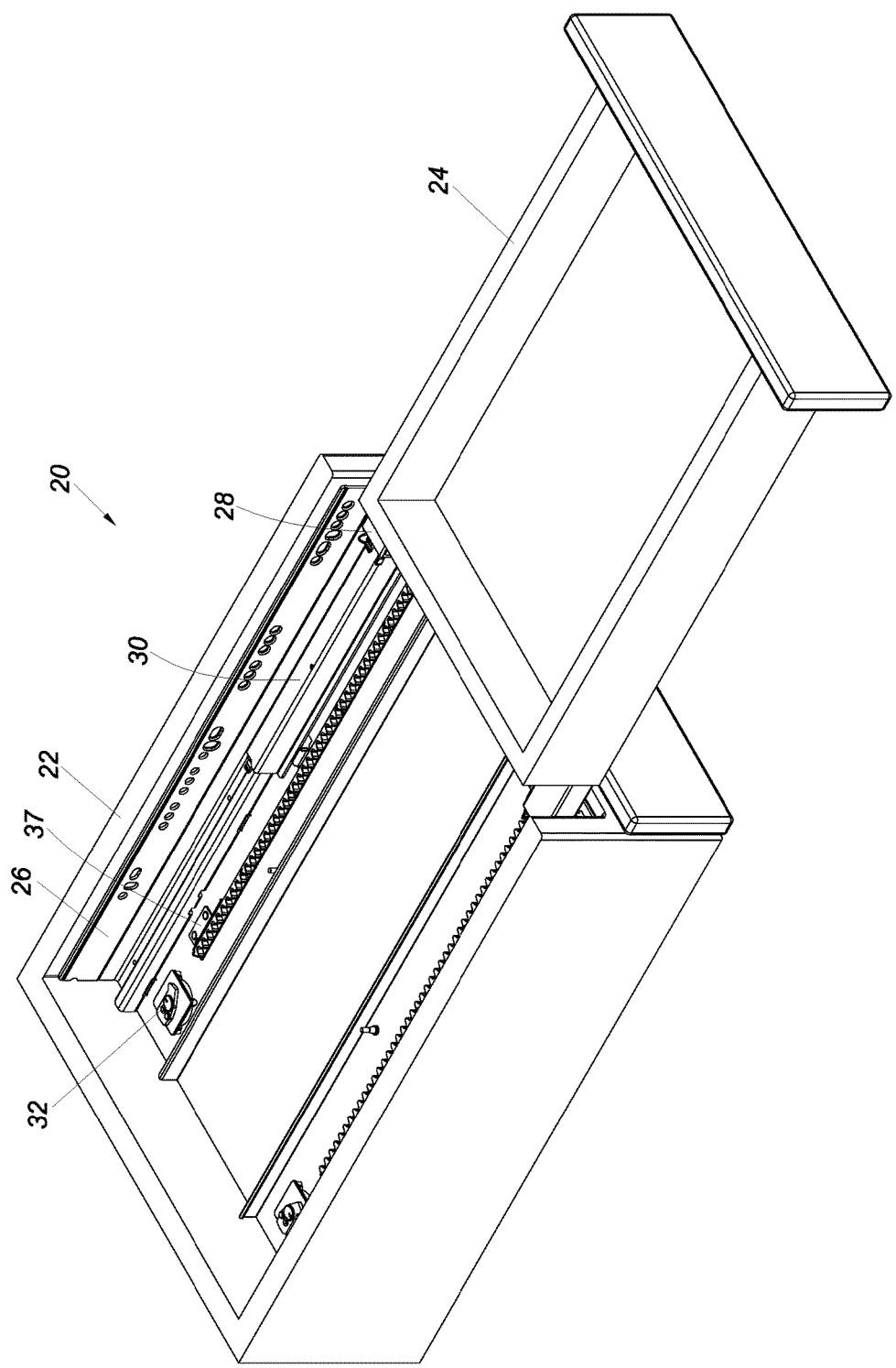
FIG. 1 is a perspective view of the furniture part assembly in an embodiment of the present invention, wherein the furniture part assembly includes a first furniture part and a second furniture part.

Referring to FIG. 1, the furniture part assembly 20 in an embodiment of the present invention includes a first furniture part 22 and a second furniture part 24 that is movable with respect to the first furniture part 22. In this embodiment, the first furniture part 22 is a cabinet body while the second furniture part 24 is a drawer. Preferably, a pair of slide rail assemblies are provided to facilitate movement of the second furniture part 24 with respect to the first furniture part 22.

Figure 2:
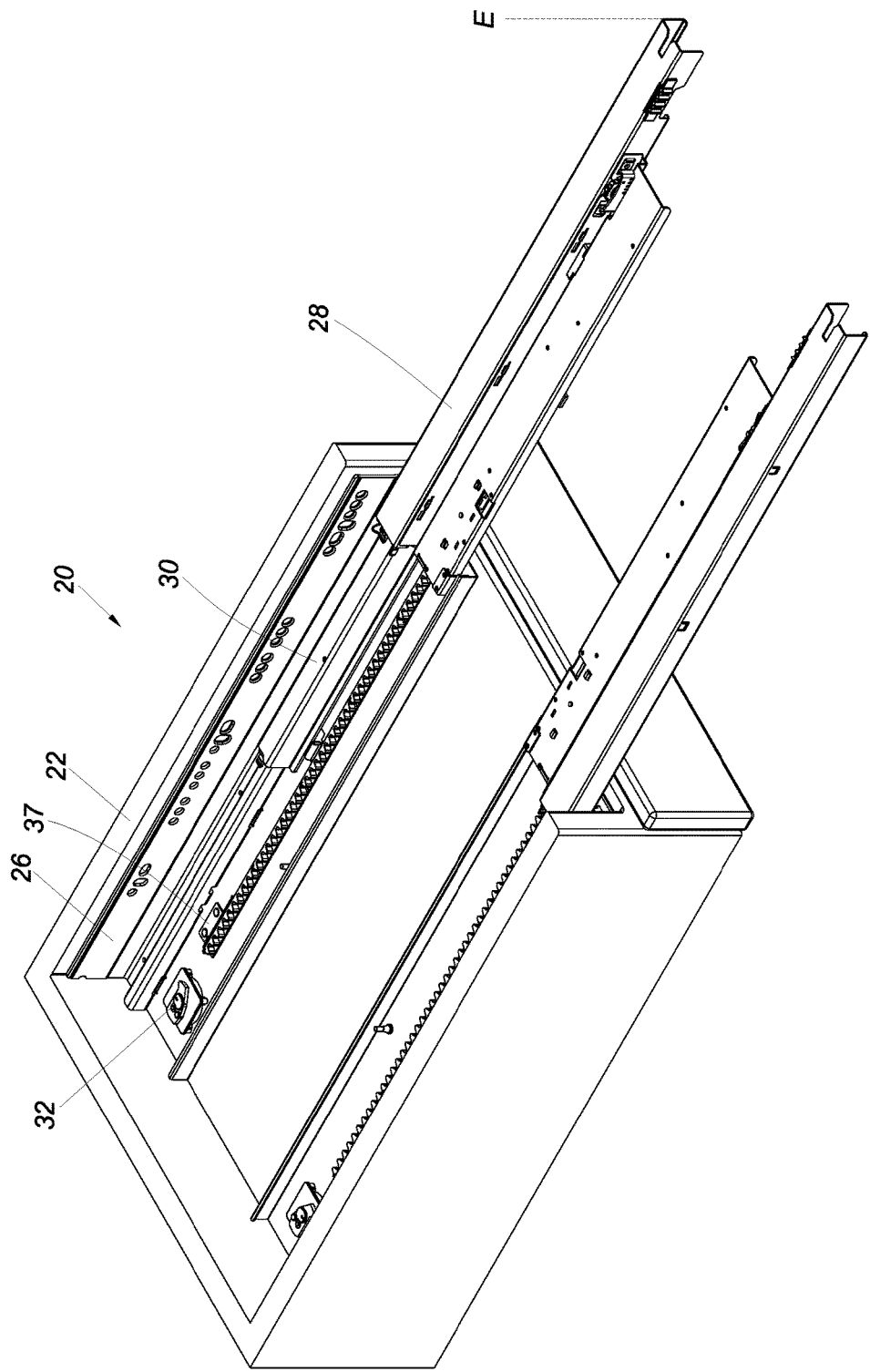
FIG. 2 is similar to FIG. 1 except that the second furniture part is removed.

As shown in FIG. 2, each slide rail assembly includes a first rail 26 and a second rail 28 that is movable with respect to the first rail 26. For example, the second rail 28 can be moved with respect to the first rail 26 from a retracted position R (see FIG. 4) to an extended position E. In this embodiment, each slide rail assembly further includes a third rail 30 for increasing the distance by which the second rail 28 can be moved with respect to the first rail 26. For the sake of simplicity, only one slide rail assembly and components associated therewith are described hereinafter. The first rail 26 is mounted on the first furniture part 22 and therefore can be viewed as a portion of the first furniture part 22. Likewise, the second rail 28 is mounted on the second furniture part 24 and therefore can be viewed as a portion of the second furniture part 24. The furniture part assembly 20 further includes a vibration detection device 32. The vibration detection device 32 may be arranged on the first furniture part 22 (e.g., the first rail 26) or the second furniture part 24 (e.g., the second rail 28). In this embodiment, the vibration detection device 32 is arranged on the first furniture part 22 (e.g., the first rail 26) by way of example.

Figure 3:
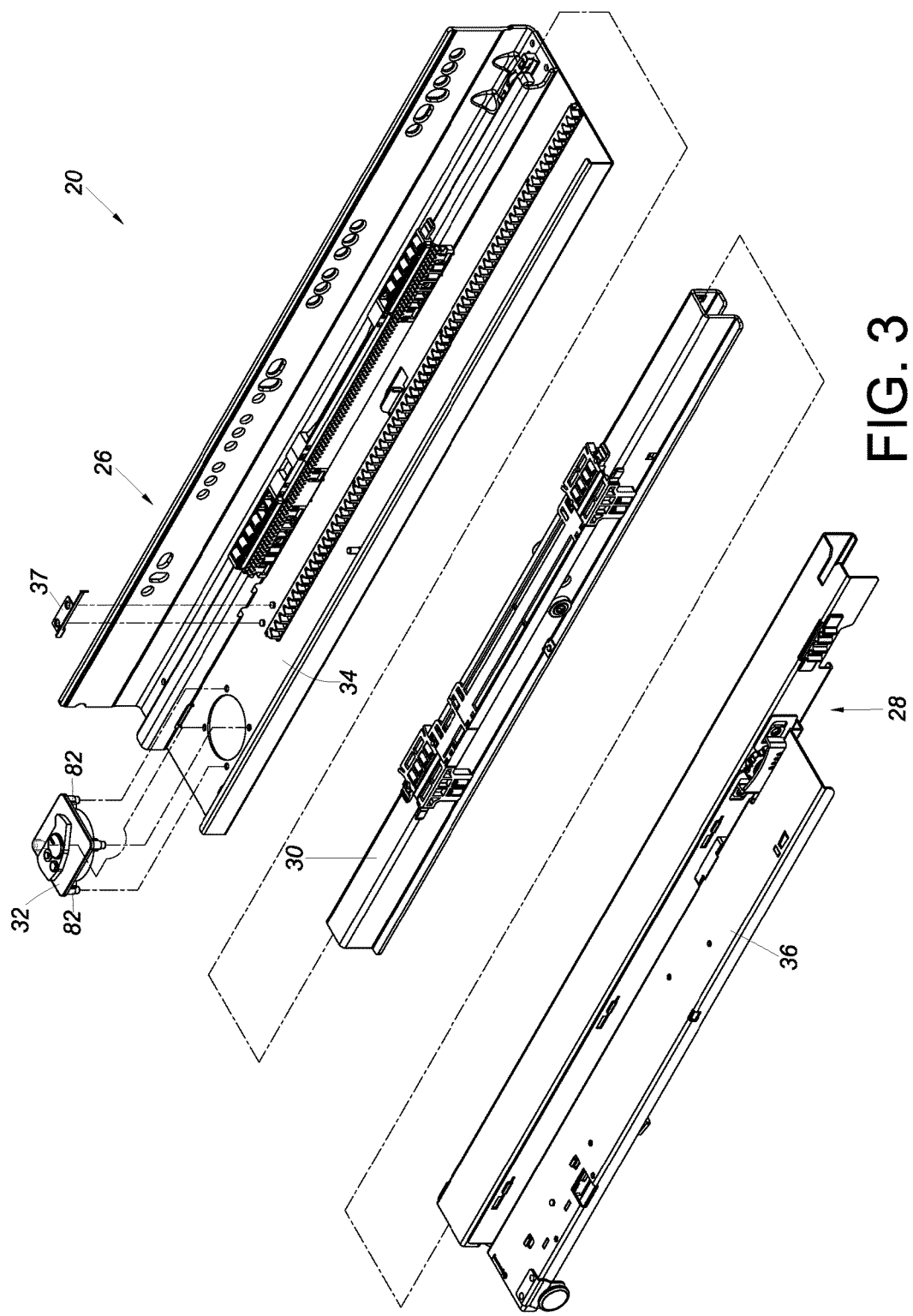
FIG. 3 is a partial exploded perspective view of the furniture part assembly in an embodiment of the present invention.

As shown in FIG. 3, the first rail 26 includes an extension portion 34, and the vibration detection device 32 is mounted on the extension portion 34 of the first rail 26. The second rail 28, on the other hand, includes a supporting portion 36. The furniture part assembly 20 further includes a disengaging feature 37 provided on the first furniture part 22 (e.g., the extension portion 34 of the first rail 26). The disengaging feature 37 can be viewed as a portion of the first furniture part 22.

Figure 4:
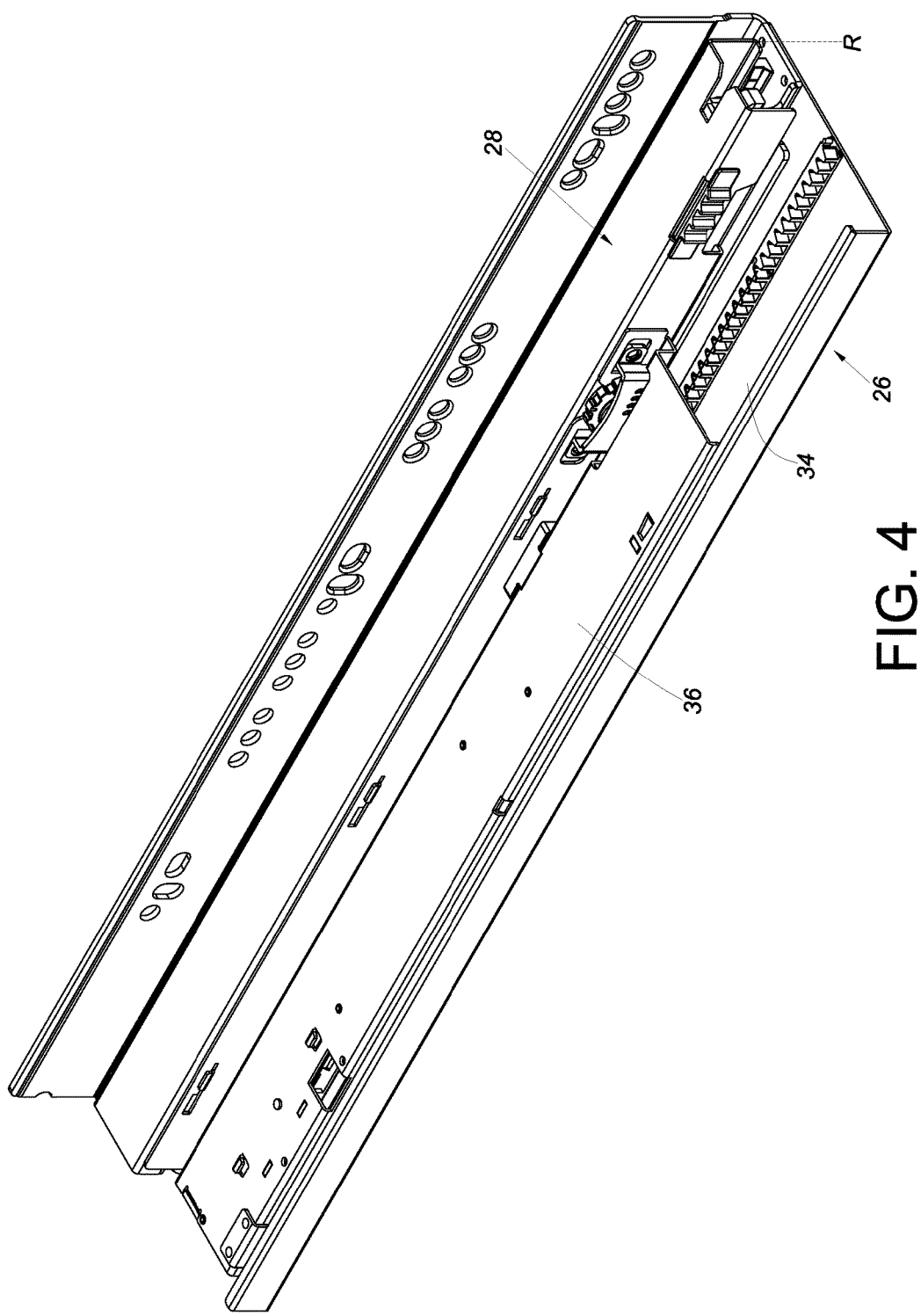
FIG. 4 is an assembled perspective view of the furniture part assembly portion in FIG. 3.

As shown in FIG. 2 and FIG. 4, the second rail 28 can be moved with respect to the first rail 26 from the extended position E to the retracted position R. The supporting portion 36 of the second rail 28 corresponds in position to the extension portion 34 of the first rail 26.

Referring to FIG. 5 and FIG. 6, the furniture part assembly 20 further includes an auxiliary member 39 movably mounted on the second furniture part 24. For example, the auxiliary member 39 is movably mounted on the supporting portion 36 of the second rail 28. In addition, a slide rail component 41 is connected to the supporting portion 36 of the second rail 28.

Preferably, the furniture part assembly 20 further includes a base 43 attached to the second furniture part 24 (e.g., the supporting portion 36 of the second rail 28), and the auxiliary member 39 is pivotally connected to the base 43 via a shaft portion 45 (or shaft member). Preferably, the supporting portion 36 of the second rail 28 includes at least one positioning groove. In this embodiment, two positioning grooves 47a and 47b are provided in the base 43 by way of example. The auxiliary member 39, on the other hand, has a positioning portion 49. Once the auxiliary member 39 is pivoted with respect to the base 43, the positioning portion 49 is engaged in one of the two positioning grooves 47a and 47b to keep the auxiliary member 39 in position. Moreover, the auxiliary member 39 has a disengaging portion 51 such as an inclined or curved surface, and the second furniture part 24 (e.g., the base 43 on the supporting portion 36 of the second rail 28) includes a contact feature 53. Here, the contact feature 53 is directly formed on the base 43 and includes an inclined surface 55 (or curved surface). It is worth mentioning that the contact feature 53 need not be directly formed on the base 43 and may be a component mounted on the base 43 instead.

Figure 7:
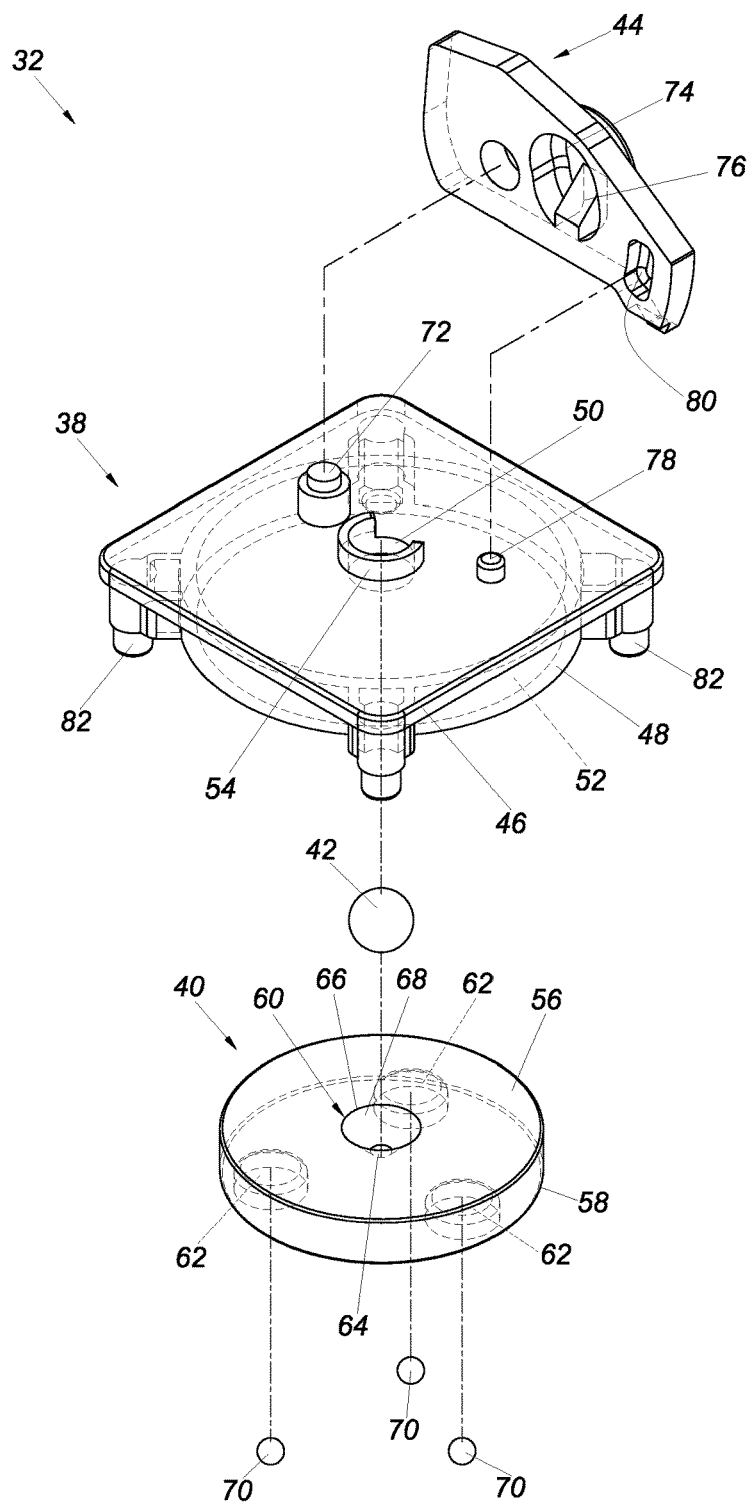
FIG. 7 is an exploded perspective view of a vibration detection device of the furniture part assembly in an embodiment of the present invention.
Figure 8:
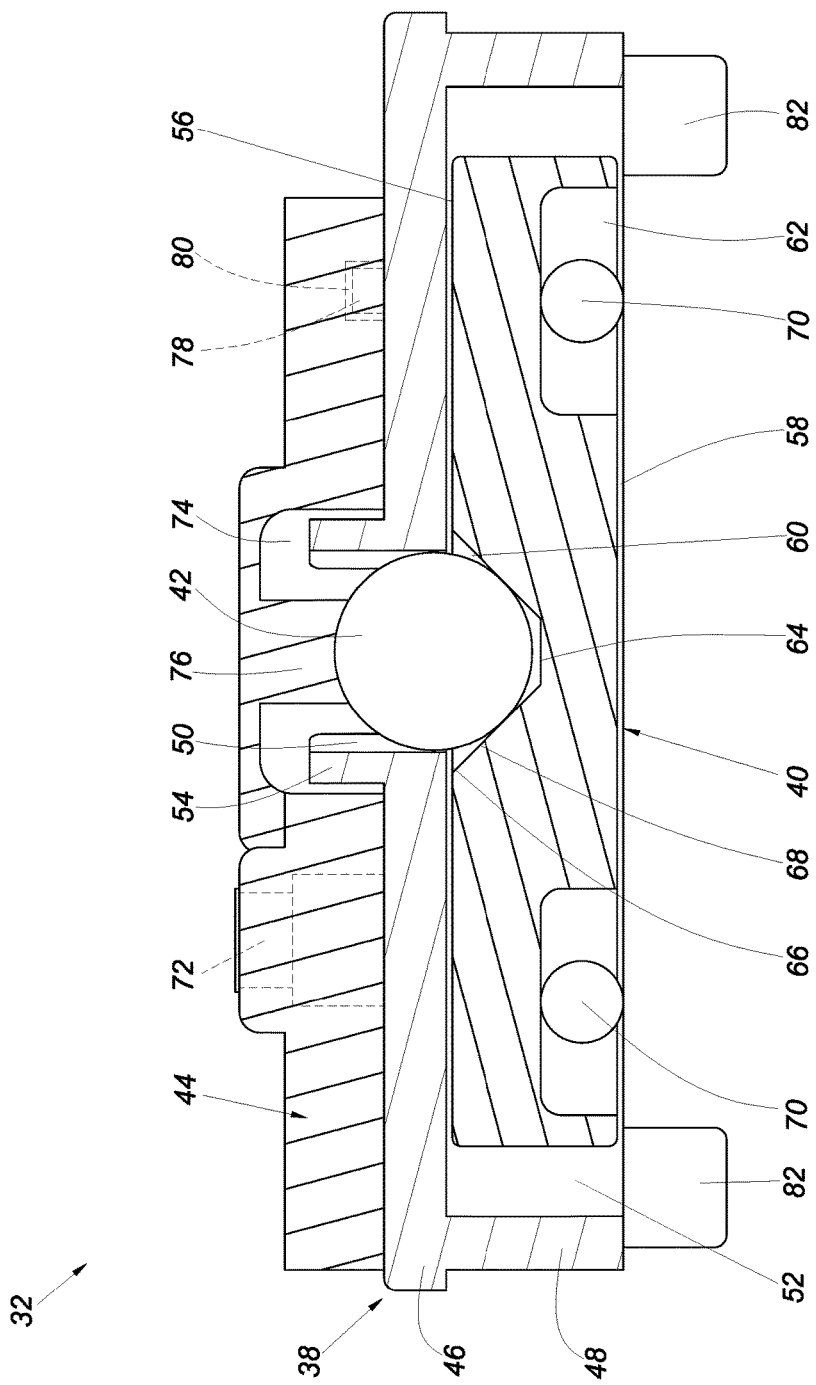
FIG. 8 is an assembled sectional view of the vibration detection device in an embodiment of the present invention.
Figure 9:
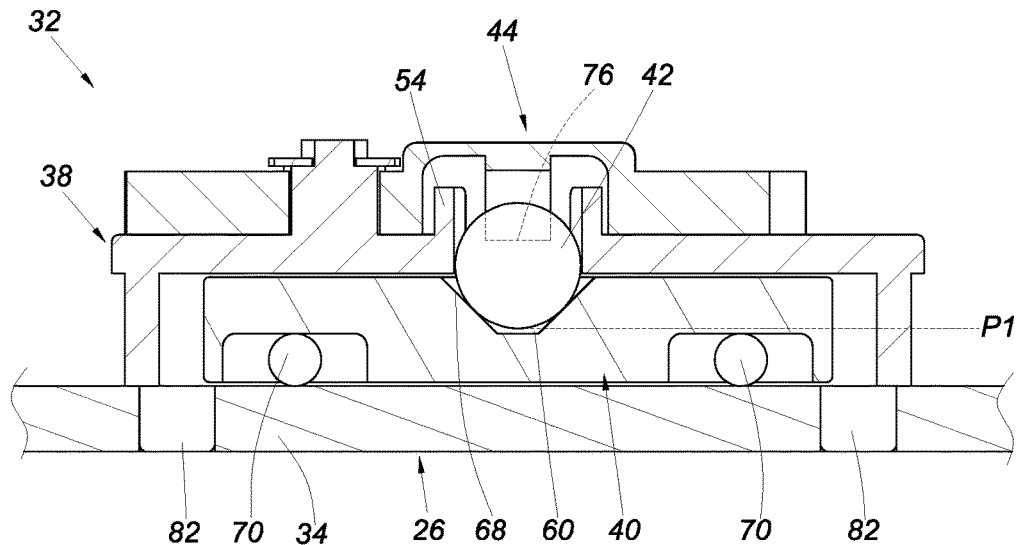
FIG. 9 is another assembled sectional view of the vibration detection device in an embodiment of the present invention, showing that a force has yet to be applied to the vibration detection device.

Referring to FIG. 7, FIG. 8, and FIG. 9, the vibration detection device 32 includes a first component 38, a second component 40, a detecting member 42, and a linking member 44.

The first component 38 is fixed to the first rail 26 (e.g., the extension portion 34 of the first rail 26). More specifically, the first component 38 includes a main body 46 and a position-limiting wall 48 adjacent to the main body 46. The main body 46 has an opening 50, and the position-limiting wall 48 defines a space 52 in communication with the opening 50. Preferably, the first component 38 further includes a wall portion 54 adjacent to the opening 50.

The second component 40 can be moved with respect to the first component 38. More particularly, the second component 40 is movably mounted to the first component 38. Preferably, the second component 40 is received in the space 52 of the first component 38 and has a smaller size than the space 52. In this embodiment, the second component 40 includes a first side 56 and a second side 58, which face opposite directions. The second component 40 further includes a supporting structure 60 and a mounting portion 62.

The supporting structure 60 is located on the first side 56 by way of example and substantially corresponds in position to the opening 50 of the first component 38. Preferably, the supporting structure 60 has a substantially conical shape. More specifically, the supporting structure 60 has a bottom portion 64, a top portion 66, and an inner wall 68 between the bottom portion 64 and the top portion 66. The top portion 66 is wider than the bottom portion 64 and is adjacent to the opening 50 of the first component 38. The inner wall 68 is tilted with respect to the bottom portion 64. In this embodiment, the inner wall 68 is an inclined or curved surface with respect to the bottom portion 64. The wall portion 54 of the first component 38 is adjacent to the periphery of the supporting structure 60. Preferably, the wall portion 54 is substantially C-shaped.

The mounting portion 62 is located on the second side 58 and is a sunken area. Preferably, the vibration detection device 32 further includes a rolling member 70 movably received in the mounting portion 62. The rolling member 70 may be a ball or roller. In this embodiment, there are plural mounting portions 62 and plural rolling members 70 by way of example.

The detecting member 42 is located between the first component 38 and the second component 40. Here, the detecting member 42 is arranged between the supporting structure 60 of the second component 40 and the first component 38. More specifically, a portion of the detecting member 42 is received in the supporting structure 60 of the second component 40 and is adjacent to the bottom portion 64 of the supporting structure 60 while the other portion of the detecting member 42 juts out of the top portion 66 of the supporting structure 60 and is adjacent to the wall portion 54 of the first component 38. The detecting member 42 may be a ball or other spherical element without limitation.

The linking member 44 is movably mounted on the first component 38. For example, the linking member 44 is pivotally connected to the main body 46 of the first component 38 via a pivotal connection member 72. Preferably, the linking member 44 has a receiving space 74 and a contact portion 76 adjacent to the receiving space 74. The receiving space 74 substantially corresponds in position to the detecting member 42. The contact portion 76 is, for example, an inclined or curved surface. Preferably, the first component 38 has a position-limiting feature, and the linking member 44 has a position-limiting feature matching the position-limiting feature of the first component 38 so that the linking member 44 can move with respect to the first component 38 within a predetermined range. Here, by way of example, the main body 46 of the first component 38 has a protruding portion 78, and the linking member 44 has a bounded furrow 80 (or slot) matching the protruding portion 78.

Figure 10:
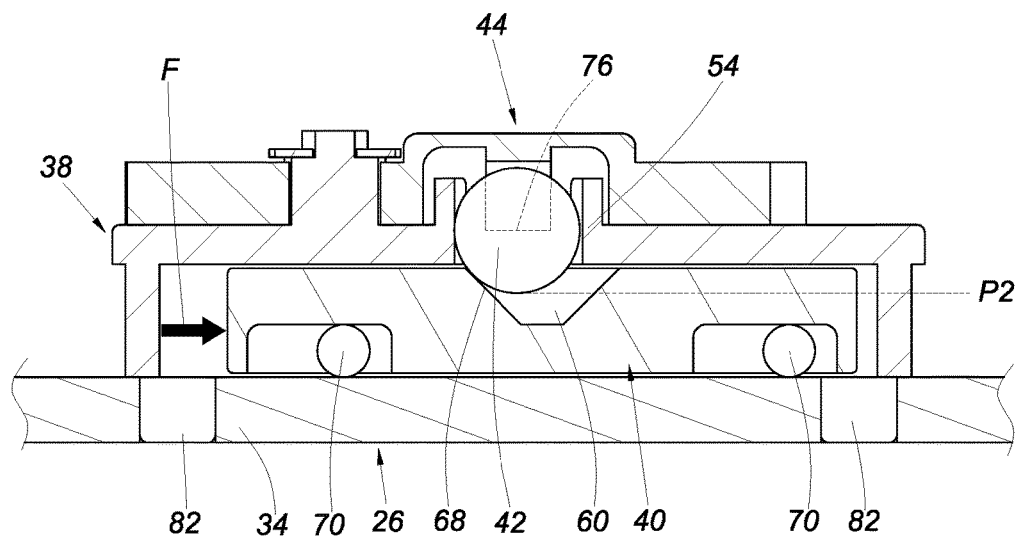
FIG. 10 is similar to FIG. 9 except that a force is applied to the vibration detection device.

Referring to FIG. 9 and FIG. 10, the first component 38 is fixed to the extension portion 34 of the first rail 26 by a connecting portion 82 (or connecting member). In this embodiment, a plurality of connecting portions 82 are provided by way of example. More specifically, the first component 38 can be fixed to the extension portion 34 of the first rail 26 by riveting, threaded connection, or mechanical engagement without limitation.

In terms of use, when the vibration detection device 32 (or the furniture part assembly 20) is subjected to a force F (e.g., an externally applied force or the vibrating force of an earthquake), the second component 40 is moved with respect to the first component 38 by the force F. The rolling members 70 (which are, for example, in contact with the extension portion 34 of the first rail 26) make it easier for the second component 40 to move with respect to the first component 38.

In response to the force F, the detecting member 42 moves from a first position P1 to a second position P2. It should be pointed out that the second position P2 is variable with respect to the first position P1, depending on the magnitude of the force F. Simply put, the detecting member 42 can leave the first position P1 and arrive at another position in response to forces F (e.g., externally applied or vibrating forces) of different magnitudes. More specifically, the detecting member 42 moves from the first position P1 to the second position P2 in response to the movement of the second component 40 with respect to the first component 38. For example, when the second component 40 moves in response to the force F, the detecting member 42 may be pressed against the wall portion 54 of the first component 38 and be driven by the inner wall 68 of the supporting structure 60 of the second component 40 from the first position P1 to the second position P2 in order to drive the linking member 44. Here, the detecting member 42 drives the linking member 44 by pushing the contact portion 76 of the linking member 44.

Figure 11:
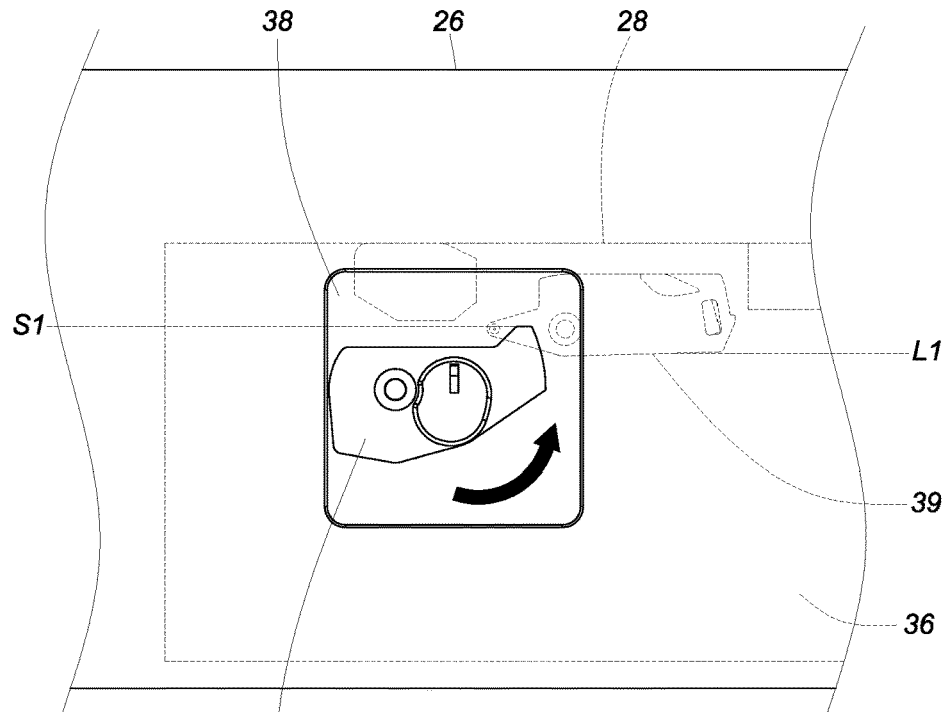
FIG. 11 is a top view showing that the linking member of the vibration detection device in an embodiment of the present invention has yet to be driven.
Figure 12:
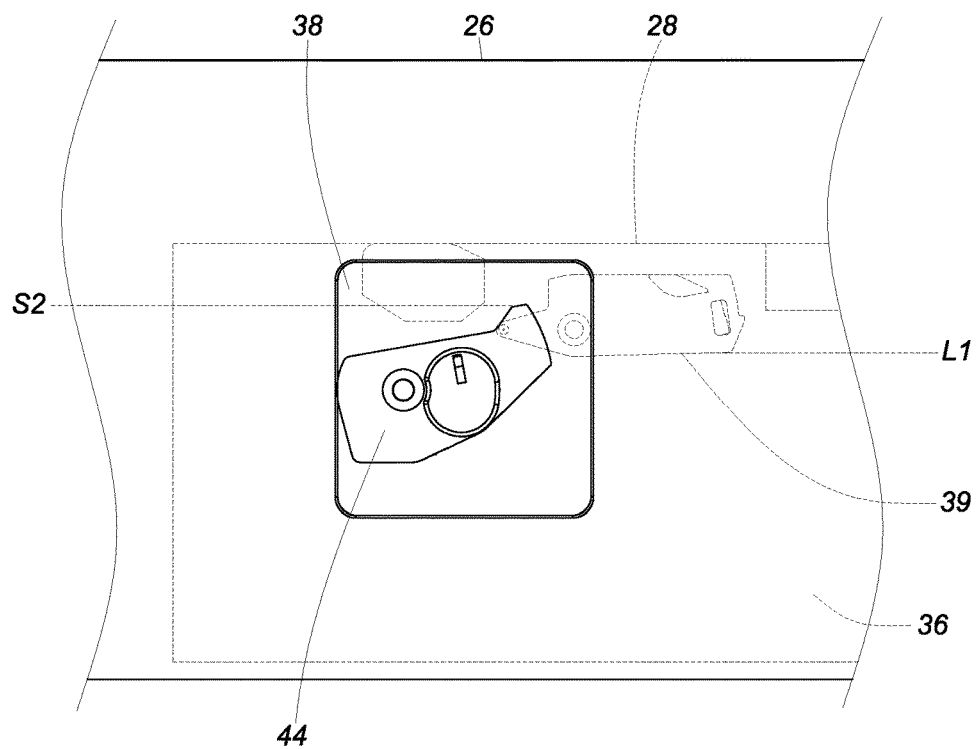
FIG. 12 is similar to FIG. 11 except that the linking member is driven.

Referring to FIG. 11 and FIG. 12, in which the auxiliary member 39 is in a first predetermined state L1 with respect to the second furniture part 24 (e.g., the supporting portion 36 of the second rail 28), the linking member 44 is driven by the detecting member 42 and brought from a first state S1 to a second state S2 with respect to the first component 38. For example, the linking member 44 is pivoted from a first position to a second position.

Figure 13:
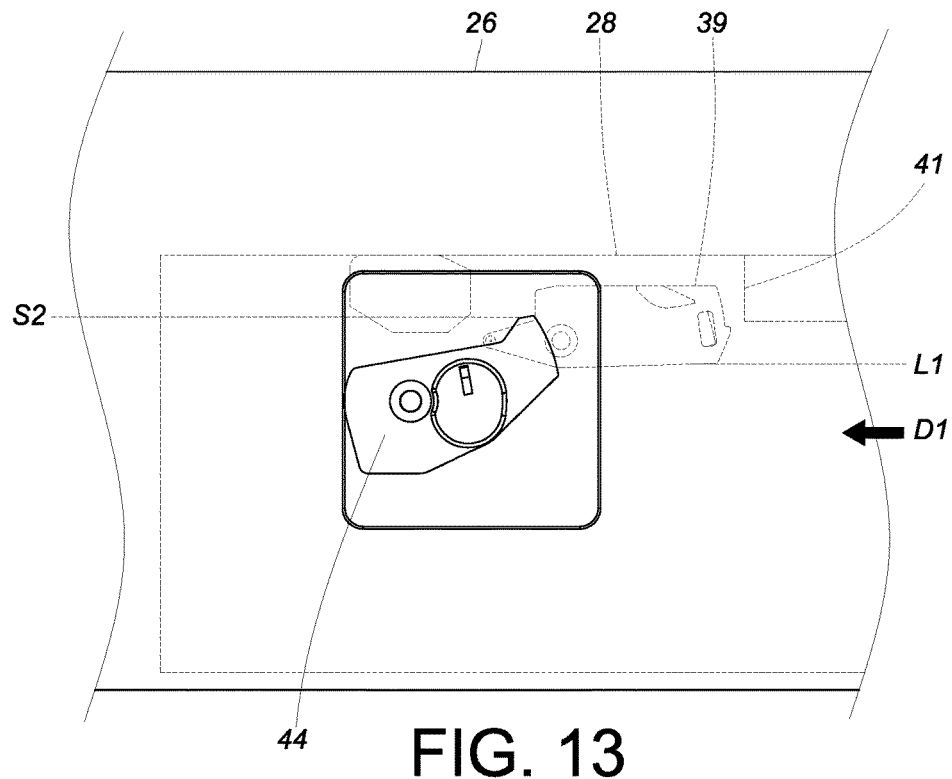
FIG. 13 is similar to FIG. 12 showing that an auxiliary member comes into contact with the linking member in response to the second furniture part moving in a certain direction with respect to the first furniture part.
Figure 14:
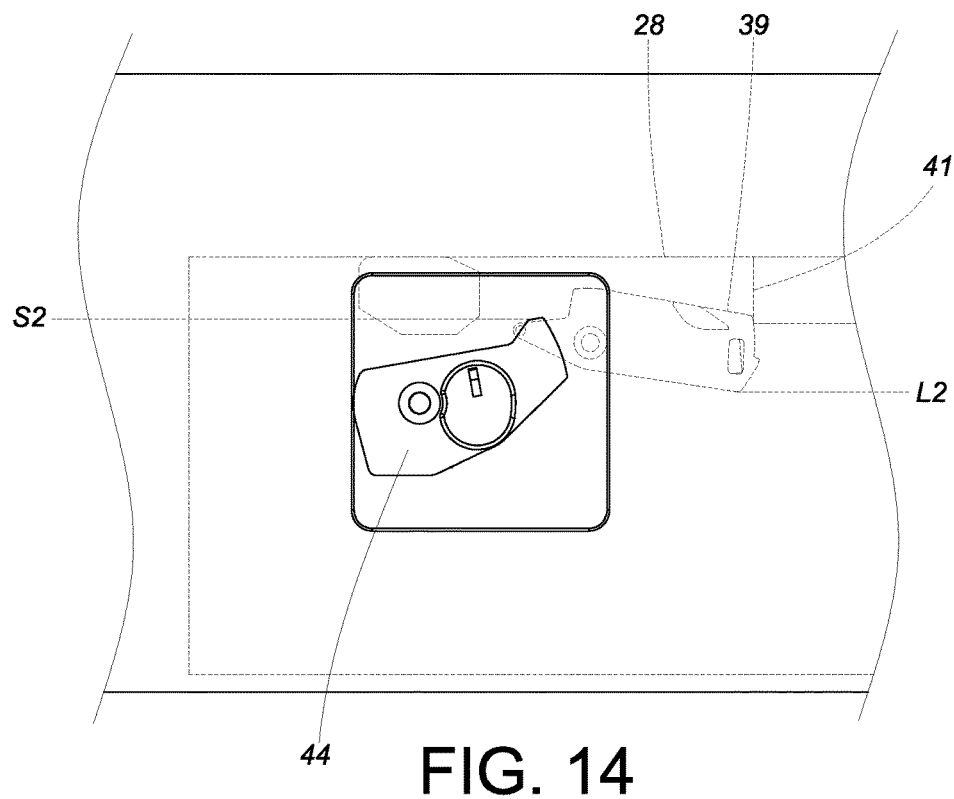
FIG. 14 is similar to FIG. 13 except that the auxiliary member is driven by the linking member after responding to the second furniture part moving in that direction with respect to the first furniture part.

Referring to FIG. 13 and FIG. 14, when the linking member 44 is in the second state S2 and an externally applied force or the vibrating force of an earthquake is acting on the second rail 28 such that, for example, the second rail 28 is moved with respect to the first rail 26 in a first direction D1, the auxiliary member 39 comes into contact with the linking member 44 in response to the second rail 28 moving in the first direction D1. As a result, the auxiliary member 39 is brought from the first predetermined state L1 to a second predetermined state L2 thanks to the linking member 44. For example, the auxiliary member 39 is pivoted from a first predetermined position to a second predetermined position, where the auxiliary member 39 is blocked between the slide rail component 41 and the linking member 44. Alternatively, by pushing the second rail 28 in the first direction D1 with respect to the first rail 26, the auxiliary member 39 will also be blocked between the slide rail component 41 and the linking member 44. In other words, when an externally applied force or the vibrating force of an earthquake is large enough to drive the linking member 44 to the second state S2, the foregoing design ensures that the second rail 28 will not move inadvertently with respect to the first rail 26 because of the externally applied or vibrating force.

Referring to FIG. 14 in conjunction with FIG. 4 and FIG. 10, the features described above are such that the second rail 28, when at a certain position with respect to the first rail 26 (e.g., the retracted position R), cannot move with respect to the first rail 26 in the first direction D1 from that position. If the furniture part assembly 20 includes a push-open device, the second rail 28 will be unable to be pushed from the retracted position R by the required pushing distance in the first direction D1, meaning the elastic member in the driving mechanism of the push-open device will not release its elastic force. That is to say, the second rail 28 will not be pushed open automatically with respect to the first rail 26. As push-open devices are well known in the art, a more detailed description of such devices is omitted herein for the sake of brevity.

According to the foregoing, the linking member 44 can prevent the second furniture part 24 (e.g., the second rail 28) from moving with respect to the first furniture part 22 (e.g., the first rail 26) in a certain direction when the detecting member 42 responds to the force F. In this embodiment, the second furniture part 24 (e.g., the second rail 28) is prevented from moving with respect to the first furniture part 22 (e.g., the first rail 26) from the retracted position R in the first direction D1.

Figure 15:
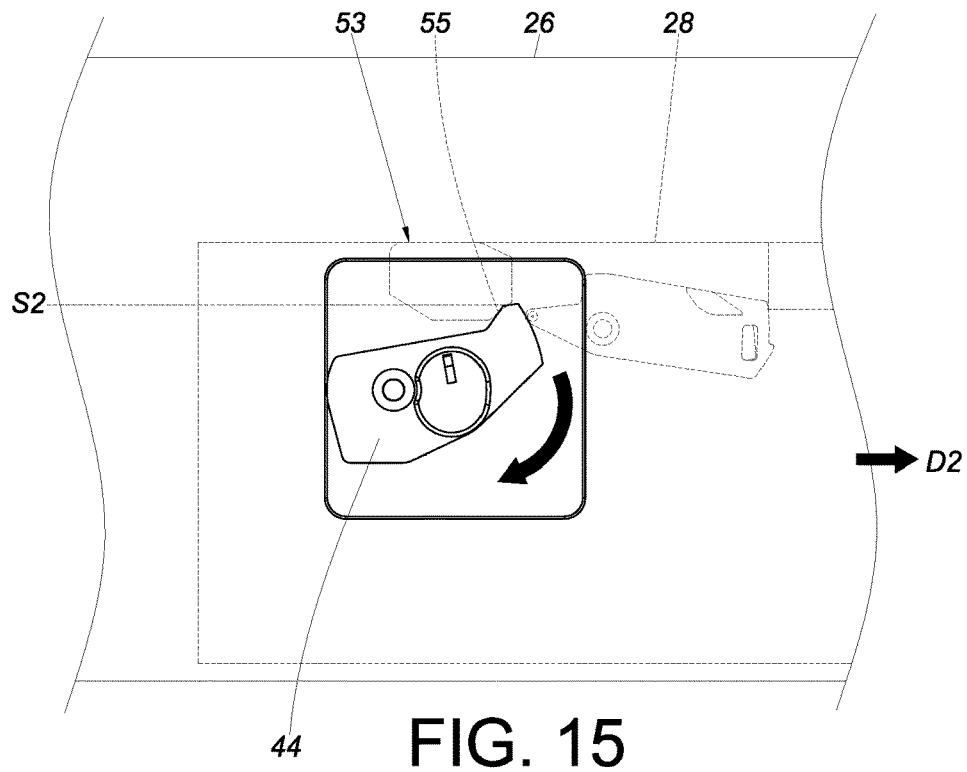
FIG. 15 is a top view showing that a contact feature of the second furniture part of the furniture part assembly is in contact with the linking member in response to movement of the second furniture part.
Figure 16:
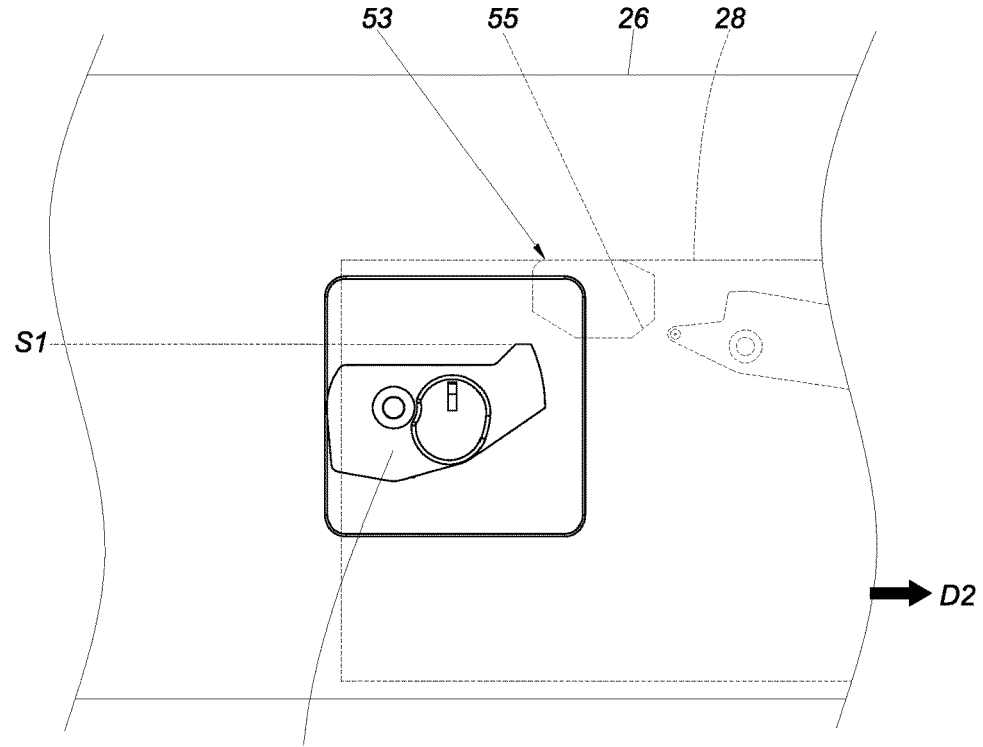
FIG. 16 is similar to FIG. 15 except that the contact feature has driven the linking member back to its original state in response to movement of the second furniture part.

Referring to FIG. 15 and FIG. 16, a user may operate the second rail 28 such that the second rail 28 is moved with respect to the first rail 26 in a second direction D2, which is the opposite direction of the first direction D1. More specifically, when the second rail 28 is moved in the second direction D2, the inclined surface 55 (or curved surface) of the contact feature 53 brings the linking member 44 from the second state S2 to the first state S1. For example, the linking member 44 is pivoted from the second position to the first position. It is worth mentioning that the linking member 44 may also have an inclined or curved surface via which the contact feature 53 can drive the linking member 44. Please note that, if the furniture part assembly 20 includes a push-open device, the opening operation may be accomplished by a pulling action as well as a pushing action. Or, the furniture part assembly 20 is further equipped with a self-closing device, which, as disclosed in U.S. Pat. No. 8,172,345 B2, is readily comprehensible by a person of ordinary skill in the art and therefore will not be dealt with in more detail.

Figure 17:
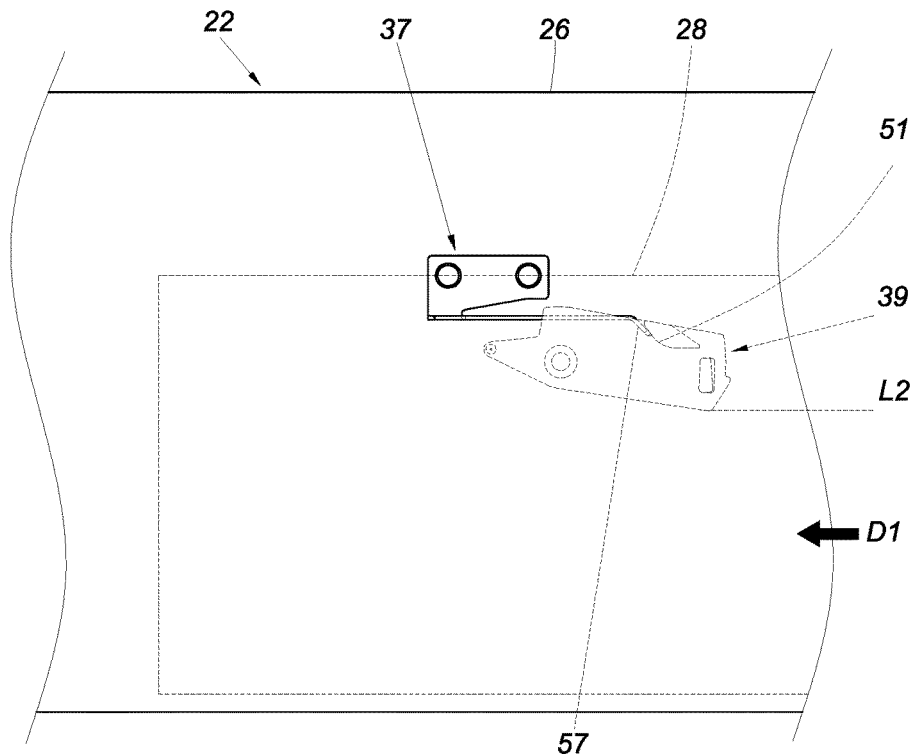
FIG. 17 is a top view showing a disengaging feature of the first furniture part of the furniture part assembly in an embodiment of the present invention, and that the auxiliary member is in contact with the disengaging feature in response to movement of the second furniture part.
Figure 18:
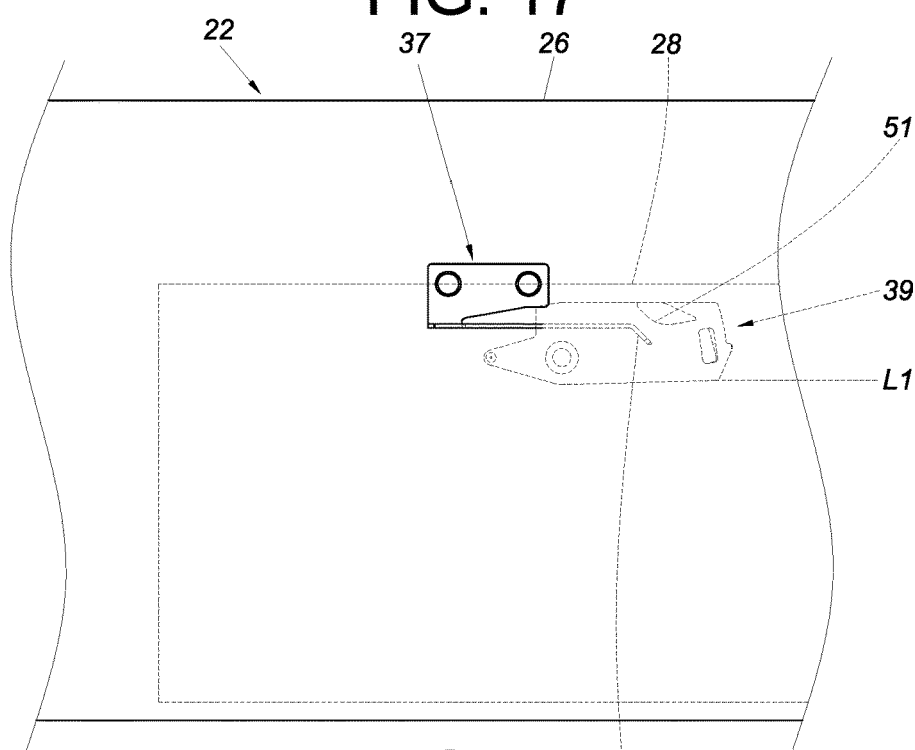
FIG. 18 is similar to FIG. 17 except that the auxiliary member has been driven by the disengaging feature back to its original state in response to movement of the second furniture part.

As shown in FIG. 17 and FIG. 18, the disengaging feature 37 may be a component mounted on the first furniture part 22 (e.g., the first rail 26). The disengaging feature 37 has an elastic portion 57.

When the second rail 28 is at a starting position (or extended position) with respect to the first rail 26, a user may move the second rail 28 with respect to the first rail 26 in the first direction D1. More specifically, this operation will drive the disengaging portion 51 of the auxiliary member 39 into contact with the elastic portion 57 of the disengaging feature 37, thereby bringing the auxiliary member 39 from the second predetermined state L2 to the first predetermined state L1. For example, the auxiliary member 39 is pivoted from the second predetermined position to the first predetermined position.

Figure 19:
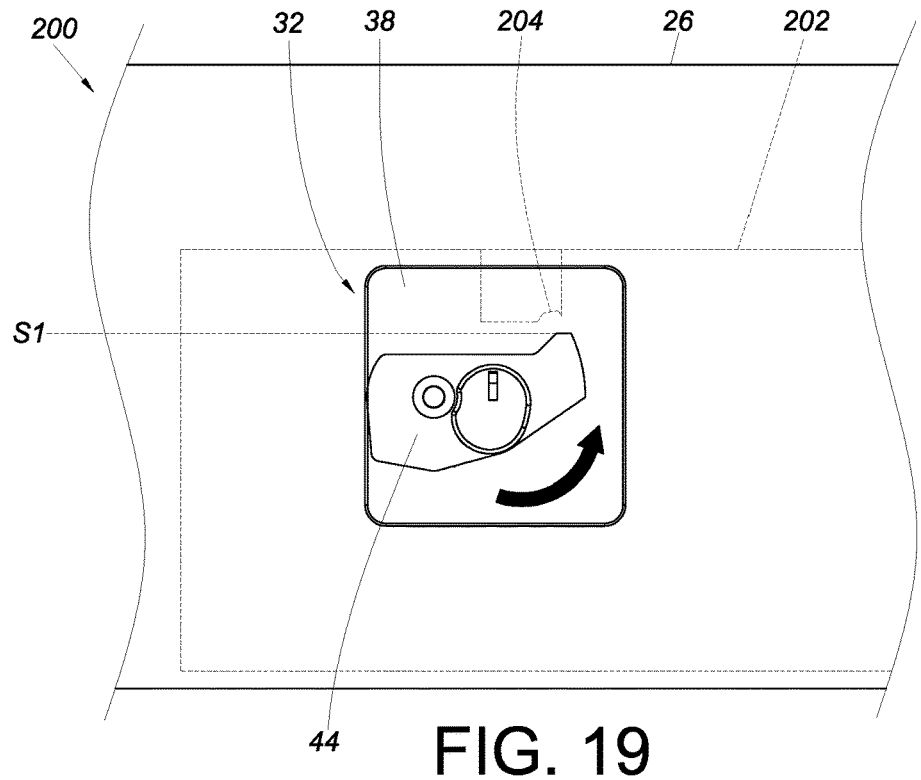
FIG. 19 is a top view showing an engaging portion of the second furniture part of the furniture part assembly in another embodiment of the present invention before the linking member of the vibration detection device is driven.
Figure 20:
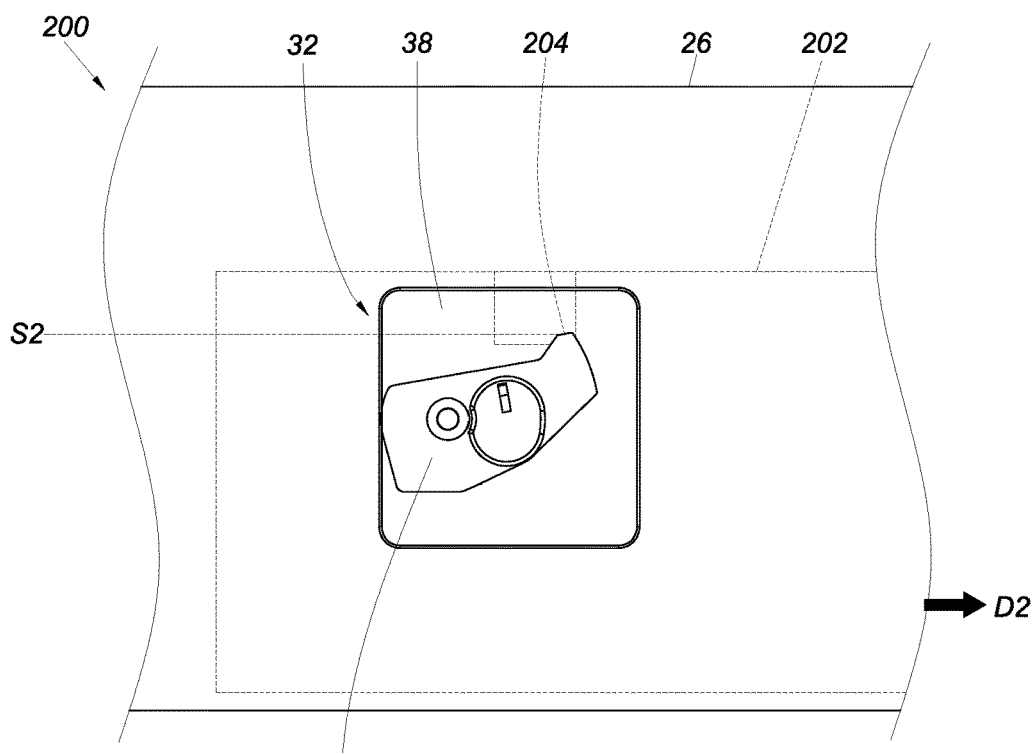
FIG. 20 is similar to FIG. 19 except that the linking member of the vibration detection device has been driven into engagement with the engaging portion of the second furniture part.

In a second embodiment, referring to FIG. 19 and FIG. 20, the furniture part assembly 200 also includes the vibration detection device 32 described above, the major difference being that the second furniture part 24 (e.g., the second rail 202) of the furniture part assembly 200 further includes an engaging portion 204.

Referring to FIG. 19 and FIG. 20 in conjunction with FIG. 10, the linking member 44 can be driven by the detecting member 42 from the first state S1 to the second state S2 with respect to the first component 38. This technical features makes it possible for the linking member 44 to engage with (or lock) the engaging portion 204 (or engaging member) of the second rail 202, thereby preventing the second rail 202 from moving with respect to the first rail 26 (or the first furniture part 22). When at the retracted position with respect to the first rail 26, therefore, the second rail 202 will not move arbitrarily with respect to the first rail 26 in the second direction D2 in response to the force F. This means that the second rail 202 is kept from opening with respect to the first rail 26 when the furniture part assembly 200 is subjected to an earthquake.

According to the above, the linking member 44 can prevent the second furniture part 24 (e.g., the second rail 202) from moving in a certain direction with respect to the first furniture part 22 (e.g., the first rail 26) when the detecting member 42 responds to the force F. In this embodiment, the second furniture part 24 (e.g., the second rail 202) is prevented from moving with respect to the first furniture part 22 (e.g., the first rail 26) from the retracted position in the second direction D2.

Figure 21:
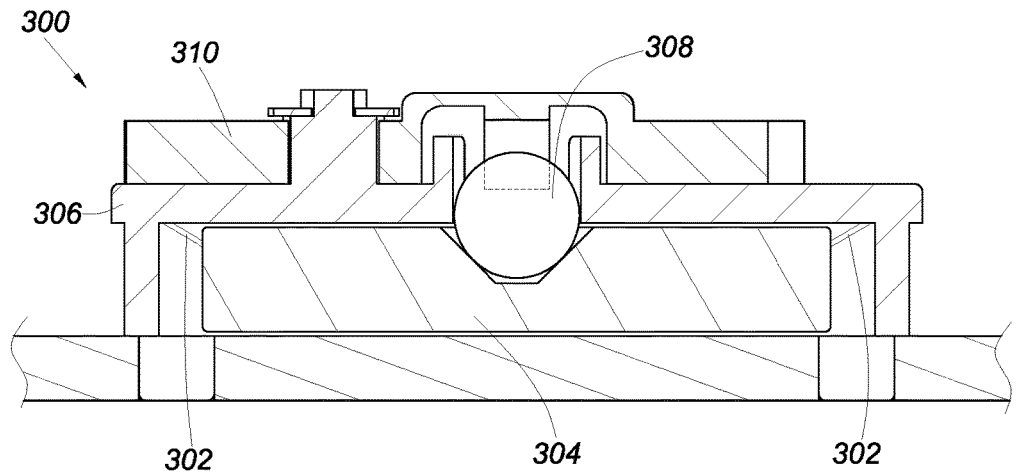
FIG. 21 is an assembled sectional view of a vibration detection device in still another embodiment of the present invention, showing no external force applied to the vibration detection device.
Figure 22:
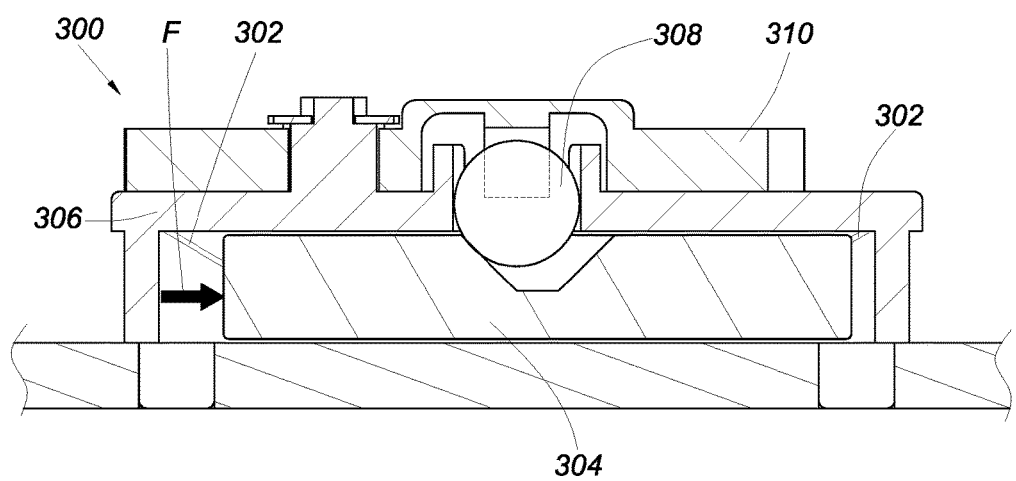
FIG. 22 is similar to FIG. 21 except that the vibration detection device is subjected to an external force.

FIG. 21 and FIG. 22 show a vibration detection device 300 in still another embodiment of the present invention. The vibration detection device 300 is different from its counterparts in the previous embodiments mainly in that it further includes a cable element 302 that is flexible, such as a spring wire. Here, the second component 304 is suspended from the first component 306 by a plurality of cable elements 302 by way of example and, as in the previous embodiments, can move with respect to the first component 306 when subjected to the force F, thereby driving the detecting member 308 and consequently the linking member 310. The working principle of this embodiment is similar to those of the foregoing embodiments and therefore will not be stated repeatedly.

While the present invention has been disclosed through the embodiments described above, it should be understood that the embodiments are not intended to be restrictive of the invention. The scope of patent protection sought by the applicant is defined by the appended claims.

The invention claimed is:

1. A furniture part assembly, comprising:
   a first furniture part;
   a second furniture part movable with respect to the first furniture part; and
   a vibration detection device arranged on one of the first furniture part and the second furniture part, the vibration detection device including a detecting member and a linking member;
   wherein when a force is applied to the vibration detection device, the detecting member drives the linking member from a first state to a second state in response to the force, thereby preventing the second furniture part from moving with respect to the first furniture part in a direction;
   wherein the vibration detection device includes a first component and a second component movably mounted to the first component, and the second component is movable with respect to the first component in response to the force in order for the detecting member to drive the linking member in response to movement of the second component; and
   wherein the linking member is movably mounted on the first component and has a contact portion, the detecting member is configured to drive the linking member via the contact portion, and the contact portion is an inclined or curved surface.

2. The furniture part assembly of claim 1, further comprising an auxiliary member movably mounted on the second furniture part and a slide rail component connected to the second furniture part, the vibration detection device being arranged on the first furniture part, wherein when the linking member is in the second state and the auxiliary member is brought from a first predetermined state to a second predetermined state, the auxiliary member is blocked between the slide rail component and the linking member.

3. The furniture part assembly of claim 2, further comprising a base attached to the second furniture part, the auxiliary member being pivotally connected to the base.

4. The furniture part assembly of claim 1, wherein the vibration detection device is arranged on the first furniture part, and the second furniture part includes a contact feature for bringing the linking member from the second state to the first state.

5. The furniture part assembly of claim 2, wherein the first furniture part includes a disengaging feature for bringing the auxiliary member from the second predetermined state to the first predetermined state.

6. The furniture part assembly of claim 2, wherein the second furniture part includes a positioning groove, and the auxiliary member has a positioning portion configured to be positioned in the positioning groove.

7. The furniture part assembly of claim 1, wherein the first component has a position-limiting feature, and the linking member has a position-limiting feature matching the position-limiting feature of the first component.

8. The furniture part assembly of claim 7, wherein the position-limiting feature of the first component is a protruding portion, and the position-limiting feature of the linking member is a furrow matching the protruding portion.

9. The furniture part assembly of claim 1, wherein the first component includes a space for receiving the second component, and the second component has a smaller size than the space.

10. The furniture part assembly of claim 1, wherein the vibration detection device includes a rolling member to facilitate movement of the second component with respect to the first component.

11. The furniture part assembly of claim 1, wherein the detecting member is a ball.

12. The furniture part assembly of claim 1, wherein the detecting member is located between the first component and the second component.

13. The furniture part assembly of claim 12, wherein the second component includes a supporting structure for supporting a portion of the detecting member.

14. The furniture part assembly of claim 13, wherein the supporting structure includes a bottom portion and an inner wall, the inner wall is tilted with respect to the bottom portion, and the first component includes a wall portion adjacent to the supporting structure.

15. The furniture part assembly of claim 1, wherein the vibration detection device includes a cable element whereby the second component is suspended from the first component, and the cable element is flexible.

* * * * *